United States Patent Office 3,337,313
Patented Aug. 22, 1967

3,337,313
POUR DEPRESSANT FOR DISTILLATE FUELS
Bruce M. Otto, Munster, Ind., assignor to Standard Oil Company, Chicago, Ill., a corporation of Indiana
No Drawing. Filed July 20, 1964, Ser. No. 383,989
11 Claims. (Cl. 44—62)

This invention relates to chlorinated hydrocarbon polymers, a process of preparing these polymers, and their use as pour-point depressants, miticides, and the like; and more particularly to chlorinated homopolymers and copolymers of ethylene in fuel oils as pour-point depressants.

In storage and use of heavy oils, such as lubricating oils, problems associated with pour point have long been in existence and have been recognized in the art. The pour point of an oil is defined as the lowest temperature at which the oil will pour or flow when chilled without disturbance under specified conditions. In the past, it has been discovered that pour-point problems also exist in the storage and use of distillate fuel oils, particularly at low temperatures. Pour-point problems arise through the formation of solid or semi-solid waxy particles within an oil composition. For example, in the storage of furnace oils or diesel oils during the winter months temperatures may decreases to a point as low as $-15$ to $-40°$ F. The decreased temperatures often cause crystallization and solidification of wax in the distillate fuel oil. This problem has been in part remedied by lowering the end point of oils used for blending furnace and diesel oils. It has also been suggested that the distillate fuel oils may be dewaxed such as by urea dewaxing. However, readjustment of end points causes loss of valuable product as blending material for distillate fuel oil stocks. Further, dewaxing operations are expensive.

Another approach in solving the problem has been to attempt to find a pour-point depressant which will lower the pour point of a distillate fuel oil. However, it has been found that the pour-point depressants normally used for lubricating oils and other heavy oils are generally ineffective in lowering the pour point of a distillate fuel oil.

Recently, it has been discovered that certain ethylene polymers provided good pour-point depressant properties in fuel oil. These polymers are disclosed in copending application Ser. No. 364,009, filed April 30, 1964 and may be described as an oil-soluble low molecular weight polyethylene or copolymer of ethylene with a mono-olefinic hydrocarbon having 3–6 carbon atoms. Usually the copolymer has at least 50 mole percent ethylene.

Although the above ethylene polymers are effective as pour-point depressants, still better pour-point depressants are desired for lowering the pour point of fuel oil. Therefore, it is an object of this invention to provide improved pour-point depressants which are more effective in pour-point depressant properties. Other objects of the invention will become apparent from the detailed description below.

I have discovered that chlorination of the above described and known ethylene polymers greatly improves their pour-point depressant properties. I have also discovered that chlorination of other ethylene polymers which were previously marginal or unacceptacle as pour-point depressants produces acceptable and often very good pour-point depressants. The new polymer may be described as an oil soluble chlorine containing low molecular weight ethylene polymer which is essentially free of crosslinking. In addition, I have discovered that the chlorine containing polymer provides improved pour-point depressant properties in a fuel oil.

It should be understood that not all polymers with chlorine have been found suitable as pour-point depressants. Paraffin wax (mol. wt. about 500) was chlorinated and products of various chlorine content did not have pour-point depressant properties.

The improved pour-point depressant of this invention is an oil soluble chlorine containing low molecular weight ethylene polymer which is essentially free of crosslinking and has a chlorine content of not more than about 35% by weight. The ethylene polymer includes polyethylene and copolymers of ethylene with mono-olefinic hydrocarbons having 3–6 carbon atoms. The copolymers have at least 50 mole percent ethylene.

The chlorine-containing polymers of this invention are advantageously prepared from non-chlorinated ethylene polymers of low molecular weight but have an average molecular weight of at least about 1,000. They advantageously have average molecular weights in the range of about 1,000–12,000 and preferably, for the purposes of this invention, about 1,000–7,000. They are chlorinated to a chlorine content of not more than about 35% by weight, and the resulting chlorine-containing polymers therefore have average molecular weights of about 1,000–16,000 and preferably about 1,000–9,500.

Too high an average molecular weight in the polymer adversely affects its solubility in the fuel oil. Therefore, polymers with very high molecular weights, such as those from a Ziegler process, are not considered suitable for use in this invention in fuel oil.

The average molecular weights of the above polymers may conveniently be determined by means of an ebullioscope or an osmometer. Another method is by means of the intrinsic viscosity of the polymer (D–1601–59–T in decalin solvent at 135° C.).

As stated above, the ethylene polymer includes both polyethylene and copolymers of ethylene with mono-olefinic hydrocarbons having 3–6 carbon atoms with the copolymer having at least 50 mole percent ethylene. Advantageously, the polyethylene (prior to chlorination) has a branch index (number of substituent groups per 100 carbon atoms) of not more than about 5. Advantageously, the copolymer is one of ethylene with propylene having (prior to chlorination) a branch index of at least about 6 and preferably about 6–20. A very advantageous polyethylene is one having a branch index of about 2–3 and a molecular weight of about 2,000. A very advantageous copolymer of ethylene and propylene is one having a branch index of about 10–14 and an average molecular weight of about 1,800.

When the ethylene polymers are chlorinated, naturally the branch index is increased. However, in identifying the chlorine-containing polymer it has been found more convenient to describe the chlorine content of the new polymer in terms of weight percent.

For purposes of this invention, the ethylene polymers described herein have little, if any, crosslinking; although, as described above, they include polymers with up to significant branchiness. These polymers may be described as being essentially free of crosslinking.

The chlorine-containing ethylene polymers usable in accordance with this invention are oil soluble. Generally, this means that they are completely soluble in distillate fuel oils in concentrations of at least about 10% by weight (slight haze is permissible) at room temperature (25° C.).

However, it is not always necessary that the non-chlorinated polymers possess good oil solubility. To illustrate, a polyethylene having a lower order of oil solubility, a crystallinity of about 60–70, a branch index of about 2–3, and an average molecular weight of about 2,000 has been chlorinated to produce a chlorine-containing polymer having good oil solubility, together with exceptional pour-point depressant properties.

The chlorine-containing ethylene polymers of this invention are very useful for depressing pour points of fuel oils. Most hydrocarbon fuels yield crystals of solid wax as their temperature is lowered below the cloud point. In a usual distillate fuel oil composition containing a pour-point depressant addition agent, the crystals of solid wax do not hinder flow through pumps, filters, screens, etc., even at temperatures well below the pour point of the base oil, for example, distillate fuel oil. In such cases the crystals are small and therefore do not hinder flow. However, in some fuel blends the crystals which form are sufficiently large and dense so that an immobile layer of crystals is formed at the bottom of storage tanks. Such crystals of solid wax are not susceptible to treatment by most pour-point depressants tailored for distillate fuels and the crystals can therefore cause severe flow problems. The flow problems arise when it is attempted to pump the fuel from one location to another. Pump parts, filters, and the like tend to become clogged with the crystals of solid wax which concentrate in the fuel oil at the bottom of storage tanks. The polymers of the present invention, when used as pour-point depressants, serve to improve the pumpability of a distillate fuel oil, normally tending to produce wax crystals of sufficient size and density (formed even in the persence of conventional pour-point depressants) to inhibit pumpability, in addition to lowering the pour point.

The polymers of this invention advantageously improve pumpability; for example, a chlorine-containing polyethylene of the above-defined characteristics is very active in modifying the wax crystals formed in or precipitated from troublesome fuels normally tending to form large dense crystals at lower temperatures. Although the formation of the wax is not actually inhibited when using the polymer additive of this invention, the wax appears as a very finely divided fluffy material which should be pumpable under most conditions.

Suitable polyethylenes for chlorination are advantageously products or by-products from the peroxide catalyzed polymerization of ethylene. Polymerization reactions using peroxide catalysts are well known in the art and any of these may, for example, be used to produce the desired pour-point depressor of this invention. The low molecular weight polyethylene by-products are usually oily liquid hydrocarbon mixtures, hydrocarbon greases, or hydrocarbon waxes obtained in small quantities in the mass polymerization of ethylene at elevated temperatures and pressures using a free radical polymerization catalyst, and such by-products from polymerization catalyzed by the presence of peroxides (or oxygen which forms peroxides) are particularly suitable. Another example of a product which may be used is the homopolymer by-product described by J. W. Ragsdale, U.S. 2,863,850 patented Dec. 9, 1958. Other such products are well known in the art.

The above-defined copolymer of ethylene with a mono-olefinic hydrocarbon having from 3–6 carbon atoms has at least about 50 mole percent ethylene. The mono-olefinic hydrocarbon includes propylene, butylenes, pentylenes, hexylenes, and mixtures thereof. Preferably, the mono-olefinic hydrocarbon is propylene. The copolymers are prepared by methods known in the art. Advantageously, the copolymer of ethylene with propylene is prepared by subjecting the combination to polymerization by peroxide catalyst, or a tetraphenyl tin-aluminum chloride-vanadium oxytrichloride catalyst system, or a tetraphenyl tin-aluminum chloride-vanadium tetrachloride catalyst system or a tetra-alkyl lead-vanadium tetrachloride catalyst system.

Usable polymers for chlorination in accordance herewith may also be obtained by extraction of low molecular weight polymers having branch indexes hereinbefore defined. Extraction may be accomplished using a solvent or a solvent-antisolvent. The extracted polymer is usable if it falls within the definition of the polymers of this invention as to characteristics. Such extracted fraction usually has a higher branch index and a lower intrinsic viscosity than the starting material, as well as a higher concentration of total solubility in distillate fuels and a lower crystallinity. Examples of suitable solvents are the low molecular weight hydrocarbons such as butane, pentane, hexane, heptane, etc., and examples of antisolvents, usable therewith, are the low molecular weight alcohols such as methanol, ethyl alcohol, isopropyl alcohol, n-butanol, etc. Naphtha is a particularly advantageous solvent because it does not require the use of an antisolvent. However, because polymers having the desired characteristics are available commercially and because such polymers can be "tailor-made" to have the desired characteristics, it is particularly preferred to use such polymers which do not need prior extraction. Extraction adds an expensive step to preparation of the polymers.

Such polymers for chlorination as described above are well known in the art and are readily available commercially. Many of the usable polymers for chlorination are obtained as by-products from commercial polymerization processes as undesirable low molecular weight materials and, because of their availability and economic attractiveness such by-product polymers are advantageous for use herein.

The chlorination of these polymers produces chlorine substituents on the polymer chain. These chlorine substituents increase the pour-point depressant properties of the polymer. A preferred method of preparing the chlorine-containing ethylene polymer of this invention (and thereby adding the chlorine substituents on the polymer chain) is carried out by treating the above-defined ethylene polymer with chlorine under suitable reaction conditions to produce the chlorinated ethylene polymer. This process is carried out until the desired chlorine content of the resulting polymer is reached. Usually this content is not more than about 35% by weight of the polymer. Increased amounts of chlorine tend to lessen the pour-point properties of the polymer and therefore are not preferred.

The chlorination may be carried out by one of several procedures. In one process, chlorine is bubbled through the molten polymer usually under temperature conditions of at least about 150° F. and advantageously between 150 and 400° F. A second process is carried out by bubbling chlorine through the polymer suspended in an inert solvent, such as carbon tetrachloride (and other chlorinated methanes, ethanes, and the like) under temperature conditions of at least 75° F. The rate of reaction may be accelerated by using an actinic light source. A third process is carried out by bubbling chlorine through an aqueous suspension of the polymer. The first two processes are preferred since it is believed that in their use the chlorine contacts a greater portion of the inner polymer chain. It is to be understood that the chlorine addition includes the use of known chlorinating compounds such as sulfuryl chloride, oxalyl chloride, phosgene, and the like.

It is further believed, but again not known absolutely, that the chlorination of the ethylene polymer produces the chlorine-containing polymer having the chlorine atoms with such a distribution on the polymer chain as to provide exceptional pour-point depressant properties in the polymer.

The chlorination is carried out to produce a chlorine-containing polymer having preferably less than about 35% chlorine by weight. More preferable and optimum chlorine contents are dependent somewhat on the particular polymer being chlorinated. To illustrate, a polyethylene having a branch index of not more than about 5 and a molecular weight of about 1,500–2,500 is preferably chlorinated to a chlorine content of about 10–30% by weight. More optimum pour-point depressant properties for this ploymer result when it has an average molecular weight of about 2,000, a branch index of about 2–3, and a chlorine content of about 16–23% by weight. Another illustration is a copolymer of ethylene and propylene having a branch index of about 6–20, an average molecular weight of about 1,500–2,000, and a chlorine content of about 4–13% by weight. More optimum pour-point depressant properties are obtained when this polymer has a branch index of about 10–14, an average molecular weight of about 1,800, and a chlorine content of about 8–11% by weight. More exact values for these ranges are dependent on the particular fuel oil being utilized.

The fuel oil composition of this invention comprises a major amount of a distillate fuel oil and, as an improved pour-point depressant, a small but effective amount of the above-defined chlorine-containing ethylene polymer. Usually the chlorine-containing polymer is present in an amount from about 0.001 to about 5 weight percent, advantageously from about 0.001 to about 0.1 weight percent, and preferably from about 0.005 to about 0.03 weight percent. The chlorine-containing polymer may be added directly to the fuel oil or may be formulated in concentrated form in a hydrocarbon solvent such as benezene, toluene, xylene, and the like. Additional suitable solvents are more specifically described herein below:

The fuel oil is a hydrocarbon oil such as, for example, a diesel fuel, a jet fuel, a heavy industrial residual fuel (e.g. Bunker C), a furnace oil, a heater oil fraction, kerosene, a gas oil, or any other like light oil. Of course, any mixtures of distillate oils are also intended. The distillate fuel oil may be virgin and/or cracked petroleum fractions. The distillate fuel oil may advantageously boil in the range of from about 250 to about 750° F. The distillate fuel oil may contain or consist of cracked components such as, for example, those derived from cycle oils or cycle oil cuts boiling heavier than gasoline, usually in the range of from about 450 to about 750° F. and may be derived by catalytic or thermal cracking. High-sulfur-containing and low-sulfur-containing oils such as diesel oils and the like may also be used. The distillate oil may, of course, contain other components such as addition agents used to perform particular functions, for example, rust inhibitors, corrosion inhibitors, antioxidants, sludge stabilizing compositons, etc.

The preferred distillate fuel oils have an initial boiling point in the range of from about 250 to about 475° F. and an end point in the range of from about 500 to about 750° F. The distillate fuel oil may advantageously have an A.P.I. gravity of about at least 30 and a flash point (Tag closed cup) not lower than about 110° F. and preferably above about 115° F.

The chlorine-containing polymers of this invention may, for convenience, be prepared as addition agent concentrates. Accordingly, the polymer is dissolved in a suitable organic solvent therefor in amounts greater than 10% and preferably from about 10% to about 75%. The solvent in such concentrates may conveniently be present in amounts from about 25% to about 90%. The organic solvent preferably boils within the range of from about 100° F. to about 700° F. The preferred organic solvents are hydrocarbon solvents, for example, petroleum fractions such as naphtha, heater oil, mineral spirits, and the like; aromatic hydrocarbons such as benzene, xylene and toluene; paraffinic hydrocarbons such as hexane, pentane, etc. The solvents selected should, of course, be selected with regard to possible beneficial or adverse effects they may have on the ultimate fuel oil composition.

The following examples illustrate some embodiments of this invention. It is to be understood that these are for illustrative purposes only and do not purport to be wholly definitive with respect to conditions or scope.

EXAMPLE I

A polyethylene was chlorinated to produce a chlorine-containing polymer with pour-point depressant properties. The polyethylene was purchased from the Allied Chemical Co. and identified as AC–6 having the following characteristics:

Ave. M. Wt. _____ 2,000
Melting Pt. _____° F. (ASTM E28–51T)__ 219–226
Hardness _____(ASTM D1321–55T)__ 3–5
Specific Gravity _____ 0.92
Average Vis. cps./140° C. _____ 180
Branchiness (branches/100C atoms) _____ 2–3
Crystallinity, percent _____ 60–70

The polyethylene was charged to a glass reactor and heated slowly to approximately 250° F. under a constant stream of inert gas.

Chlorine addition was initiated and maintained at a rate such that the reaction mixture remained between 250 and 260° F. without external heating. Rapid stirring was carried out during the reaction.

The reaction was allowed to continue until the desired chlorine content was reached. Separate runs were carried out to produce chlorine-containing polymers having different chlorine contents. The chlorine content was determined by fixed-channel X-ray fluorescence. Then, the reaction product was flushed for several minutes with an inert gas to dispel any occluded chlorine or hydrochloric acid. The chlorine-containing products prepared above were then tested as pour-point depressants. The pour point was determined according to the procedures in ASTM D97. The test oil was a light catalytic cycle oil with the pour point of +7° F. and the following characteristics:

IBP _____° F__ 390
10% _____° F__ 450
50% _____° F__ 532
90% _____° F__ 613
EP _____° F__ 646
Gravity _____° API__ 29.3
Viscosity, 39.3 SUS _____° F__ 100

Table I lists the results.

TABLE I.—EFFECT OF CHLORINE CONTENT ON DEPRESSANT ACTIVITY OF CHLORINATED POLYETHYLENE IN LIGHT CATALYTIC CYCLE OIL

| Conc. of Polymer in Oil (wt. percent) | Wt. Percent Chlorine in Polymer | | | | | | | | | |
|---|---|---|---|---|---|---|---|---|---|---|
| | Nil | 5.2 | 10.0 | 13.2 | 16.0 | 20.2 | 22.4 | 23.5 | 27.5 | 28.5 |
| | Pour Points, ° F. | | | | | | | | | |
| 0.005 | +7 | +2 | −6 | −18 | −30 | −43 | −40 | −12 | 0 | +6 |
| 0.010 | +7 | 0 | −16 | −28 | −46 | *−60 | *−60 | *−60 | −12 | +4 |
| 0.020 | +7 | −4 | −26 | −44 | *−60 | *−60 | *−60 | *−60 | *−60 | −4 |
| 0.030 | +4 | −14 | −38 | −50 | *−60 | *−60 | *−60 | *−60 | *−60 | −22 |

*Still pouring.

The above results demonstrate the impressive lowering of the pour point of the light catalytic cycle oil sample by the chlorinated polyethylene in contrast to the uneffective non-chlorinated polyethylene. At a concentration of 0.005 wt. percent, the chlorinated polyethylene in light catalytic cycle oil provided pour points of −30° F. at 16.0% $Cl_2$, −43° F. at 20.2% $Cl_2$, and −40° F. at 22.4% $Cl_2$, compared with +7° F. for the light catalytic cycle oil without the polymer (or with the non-chlorinated polyethylene).

EXAMPLE II

The pour-point depressant properties of the chlorine-containing polymer of Example I containing 20.2 weight percent chlorine were compared with those of the non-chlorinated polymer of Example I and known pour-point depressants (A and B). The same light catalytic cycle oil used in Example I was used in the tests on the known pour-point depressants. The results are in Table II below:

TABLE II.—COMPARATIVE POUR-POINT DEPRESSANT TEMPERATURES IN °F. OF ADDITIVES IN LIGHT CATALYTIC CYCLE OIL

| Conc. (wt. percent) | Chlorinated Polymer | Non-Chlorinated Polymer | A | B |
|---|---|---|---|---|
| 0 | +7 | +7 | +7 | +7 |
| 0.005 | −43 | +7 | −4 | −10 |
| 0.010 | *−60 | +7 | −10 | −30 |
| 0.015 | *−60 | +7 | −16 | −36 |
| 0.020 | *−60 | +7 | −20 | −51 |
| 0.025 | *−60 | +7 | −24 | −54 |
| 0.030 | *−60 | +4 | −35 | −58 |
| 0.12 | | +2 | *−60 | *−60 |

*Still pouring.

The above results demonstrate that the chlorinated polyethylene provided exceptionally good pour-point properties in light catalytic cycle oil (−60° F. (*) at 0.010 weight percent) in contrast to the nonchlorinated polyethylene (+7° F. at 0.010 weight percent). The chlorinated polymer also provided superior pour-point properties in comparison to those of the known pour-point depressants A and B. At a concentration of 0.010 weight percent, the chlorinated polyethylene in light catalytic cycle oil provided a pour point of −60° F.*, in contrast to −10° F. for A and −30° F. for B.

EXAMPLE III

The pour-point depressant properties of a chlorine-containing copolymer of ethylene and propylene were determined. The copolymer before chlorination had an average molecular weight of about 1,500–2,000 and a branch index of about 10–14. Chlorination was carried out essentially by the procedure of Example I. The pour-point tests were carried out with light catalytic cycle oil. The results are listed in Table III below. Since the non-chlorinated copolymer had some effectiveness as a pour-point depressant, it will be noted that the pour points for "nil" percent chlorine change with concentration.

TABLE III.—EFFECT OF CHLORINE CONTENT ON DEPRESSANT ACTIVITY OF CHLORINATED ETHYLENE-PROPYLENE COPOLYMER IN LIGHT CATALYTIC CYCLE OIL

| Conc. of Copolymer Oil (wt. percent) | Wt. Percent Chlorine in Copolymer ||||||||||
|---|---|---|---|---|---|---|---|---|---|---|
| | Nil | 2.3 | 3.2 | 4.4 | 5.6 | 8.0 | 9.6 | 12.3 | 13.0 | 16.0 |
| | Pour Points, °F. ||||||||||
| .005 | −3 | −3 | −4 | −6 | −4 | −5 | 0 | 0 | +6 | +7 |
| .010 | −13 | −14 | −16 | −24 | −30 | −32 | −23 | −7 | 0 | −1 |
| .020 | −21 | −28 | −31 | −43 | *−60 | *−60 | *−60 | *−60 | −16 | −10 |
| .030 | −31 | −43 | −44 | *−60 | *−60 | *−60 | *−60 | *−60 | *−60 | *−60 |

*Still pouring.

The above results demonstrate the impressive lowering of the pour point of the light catalytic cycle oil sample by the chlorinated copolymer in comparison to the pour point lowering provided by the non-chlorinated copolymer. At a concentration of 0.010 weight percent in light catalytic cycle oil, the chlorinated copolymer (with 8.0 weight percent chlorine) in light catalytic cycle oil provided a pour point of −32° F. while the non-chlorinated copolymer in light catalytic cycle oil provided only −13° F.

EXAMPLES IV AND V

The chlorine-containing polyethylene of Example I and the copolymer of Example III were individually tested in virgin gas oil as pour-point depressants. Tables IV and V list the results of these tests.

TABLE IV.—EFFECT OF CHLORINE CONTENT ON DEPRESSANT ACTIVITY OF CHLORINATED POLYETHYLENE IN VIRGIN GAS OIL

| Conc. (wt. percent) | Wt. Percent Chlorine |||||||||
|---|---|---|---|---|---|---|---|---|---|
| | Nil | 5.2 | 10.0 | 13.2 | 16.0 | 20.2 | 22.4 | 23.5 | 27.5 | 28.5 |
| | Pour Points, °F. |||||||||
| .005 | +4 | +2 | 0 | −2 | −2 | 0 | −2 | 0 | +2 | +2 |
| .010 | +4 | 0 | −2 | −6 | −8 | −8 | −10 | −6 | 0 | 0 |
| .020 | +2 | −4 | −6 | −16 | −16 | −16 | −20 | −22 | −6 | −4 |
| .030 | +2 | −8 | −10 | −18 | −24 | −22 | −40 | −42 | −16 | −10 |

TABLE V.—EFFECT OF CHLORINE CONTENT ON DEPRESSANT ACTIVITY OF CHLORINATED ETHYLENE-PROPYLENE COPOLYMER IN VIRGIN GAS OIL

| Conc. (wt. percent) | Wt. Percent Chlorine | | | | | | | | |
|---|---|---|---|---|---|---|---|---|---|
| | Nil | 2.3 | 3.2 | 4.4 | 5.6 | 8.0 | 9.6 | 12.3 | 16.0 |
| | Pour Points, °F. | | | | | | | | |
| .005 | +4 | | | +2 | 0 | 0 | 0 | 0 | +2 |
| .010 | 0 | | | 0 | -2 | -4 | -2 | -2 | 0 |
| .020 | -4 | | | -4 | -10 | -8 | -8 | -6 | -4 |
| .030 | -8 | | | -10 | -12 | -12 | -12 | -10 | -10 |

The above results demonstrate the beneficial effect on the pour point of the virgin gas oil by the chlorinated polyethylene and by the chlorinated copolymer. At a concentration of 0.010 weight percent, the chlorinated polyethylene in virgin gas oil provided the pour point of −10° F. at 22.4 weight percent chlorine in contrast to +4° F., that provided by the non-chlorinated polyethylene. At the same concentration, the chlorinated copolymer provided a pour point of −4° F. at 8.0 weight percent chlorine in contrast to 0° F., that provided by the non-chlorinated copolymer.

In addition, the results in Tables I, III, IV, and V of Examples I, III, IV, and V respectively, show that preferred and optimum ranges of chlorine content for the chlorinated polyethylene were about 10–30 weight percent and about 16–23 weight percent respectively; and for the chlorinated copolymer were about 4–13 weight percent and about 8–11 weight percent respectively.

EXAMPLE VI

A polyethylene with an average molecular weight of about 12,000 was chlorinated and tested for its pour-point depressing properties in a light catalytic cycle oil. The results of the tests demonstrated that the chlorinated polymer improved the pour-point properties of the light catalytic cycle oil.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

I claim:

1. A fuel oil composition comprising a major amount of a distillate oil and as an improved pour-point depressant, a small but effective amount of an oil soluble chlorine-containing low molecular weight ethylene polymer which is essentially free of crosslinking, said polymer being selected from a class consisting of polyethylene and copolymers of ethylene and a mono-olefinic hydrocarbon having from 3–6 carbon atoms, said copolymer having at least 50 mole percent ethylene, said chlorine-containing ethylene polymer having an average molecular weight in the range from about 1,000 to about 16,000 and a chlorine content of about 4 to about 35 by weight.

2. The fuel oil composition of claim 1 wherein said fuel oil boils in a range from about 250–750° F.

3. The fuel oil composition of claim 1 wherein said amount is from about 0.001 to about 0.1% by weight.

4. The fuel oil composition of claim 1 wherein said chlorine-containing ethylene polymer has an average molecular weight of about 1,000–9,500.

5. The fuel oil composition of claim 4 wherein said ethylene polymer is polyethylene.

6. The fuel oil composition of claim 4 wherein said ethylene polymer is a copolymer of ethylene and propylene.

7. The fuel oil composition of claim 5 wherein said polymer is a chlorinated polyethylene which prior to chlorination has a branch index of not more than about 5 and a molecular weight of about 1,500–2,500 and after chlorination has a chlorine content of about 10–30% by weight.

8. The fuel oil composition of claim 6 wherein said polymer is a chlorinated copolymer of ethylene and propylene which prior to chlorination has a branch index of about 6–20 and a molecular weight of about 1,500–2,000 and after chlorination has a chlorine content of about 4–13% by weight.

9. The fuel oil composition of claim 7 wherein said branch index is about 2–3, said molecular weight is about 2,000 and said chlorine content is about 16–23% by weight.

10. The fuel oil composition of claim 8 wherein said branch index is about 10–14, said molecular weight is about 1,800, and said chlorine content is about 8–11% by weight.

11. A fuel oil composition concentrate for addition to fuel oil for pour-point depressant purposes, said concentrate containing from about 10% to about 75% by weight of the polymer defined in claim 1 and from about 25% to about 90% by weight of a hydrocarbon solvent boiling at a temperature in the range of from about 100° F. to about 700° F., said concentrate being capable of dilution with a distillate fuel oil to a polymer concentration in the range of from 0.001 to 0.1 percent.

References Cited

UNITED STATES PATENTS

| | | | |
|---|---|---|---|
| 2,087,682 | 7/1937 | Davis et al. | 252—78 X |
| 2,121,825 | 6/1938 | Prutton | 252—58 X |
| 2,155,204 | 4/1939 | Prutton | 252—58 X |
| 2,225,318 | 12/1949 | Morway et al. | 252—58 |
| 3,245,766 | 4/1966 | Lifson et al. | 44—62 |

FOREIGN PATENTS 646,267   8/1962   Canada.

DANIEL E. WYMAN, *Primary Examiner.*

W. J. SHINE, *Assistant Examiner.*